(12) United States Patent
Kronfeld et al.

(10) Patent No.: US 7,427,943 B1
(45) Date of Patent: Sep. 23, 2008

(54) METHOD OF GENERATING THREE-DIMENSIONAL WEATHER INFORMATION FROM AIRBORNE WEATHER RADAR IMAGERY

(75) Inventors: Kevin M. Kronfeld, Cedar Rapids, IA (US); Mathew S. Chackalackal, Davenport, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 536 days.

(21) Appl. No.: 10/624,244

(22) Filed: Jul. 22, 2003

(51) Int. Cl.
G01S 13/95 (2006.01)
G01S 7/20 (2006.01)
G01S 13/00 (2006.01)
G01S 7/04 (2006.01)

(52) U.S. Cl. .............. 342/26 B; 342/26 R; 342/59; 342/175; 342/176; 342/180; 342/195

(58) Field of Classification Search ...... 342/26 R–26 D, 342/59, 175–186, 195
See application file for complete search history.

(56) References Cited

U.S. PATENT DOCUMENTS

| | | | | |
|---|---|---|---|---|
| 2,604,607 A | * | 7/1952 | Howell | 342/180 |
| 3,258,766 A | * | 6/1966 | Munz | 342/180 |
| 3,275,882 A | * | 9/1966 | Morse | 342/176 |
| 3,302,200 A | * | 1/1967 | Atlas | 342/26 D |
| 3,789,397 A | * | 1/1974 | Evans | 342/59 |
| 4,940,987 A | * | 7/1990 | Frederick | 342/26 D |
| 5,198,819 A | * | 3/1993 | Susnjara | 342/26 B |
| 5,202,690 A | * | 4/1993 | Frederick | 342/26 B |
| 5,398,033 A | * | 3/1995 | Michie | 342/26 B |
| 6,667,710 B2 | * | 12/2003 | Cornell et al. | 342/26 R |
| 6,690,317 B2 | * | 2/2004 | Szeto et al. | 342/26 R |
| 6,720,906 B2 | * | 4/2004 | Szeto et al. | 342/26 R |
| 6,839,018 B2 | * | 1/2005 | Szeto et al. | 342/26 R |
| 7,019,682 B1 | * | 3/2006 | Louberg et al. | 342/180 |

* cited by examiner

*Primary Examiner*—Bernarr E. Gregory
(74) *Attorney, Agent, or Firm*—Nathan O. Jensen; Kyle Eppele (57) ABSTRACT

A method of displaying real-time, three-dimensional weather information is disclosed. A first representation of a weather event along a first plane is generated from data obtained from a first radar scan. A second representation of the weather event along a second plane is generated from data obtained from a second radar scan. The first and second planes are non-coplanar. The first and second representations are combined to form a three-dimensional model of the weather event. A three-dimensional shape of the three-dimensional model is constructed. The three-dimensional shape is displayed on an avionics display.

20 Claims, 7 Drawing Sheets

METHOD OF GENERATING THREE-DIMENSIONAL WEATHER INFORMATION FROM AIRBORNE WEATHER RADAR IMAGERY

FIELD OF THE INVENTION

The invention relates to avionics, and more particularly, to a system and method for displaying weather information on an aircraft.

BACKGROUND OF THE INVENTION

The ability to display for an aircraft pilot a three-dimensional rendering of nearby terrain provides increased situational awareness at all times, regardless of the time of day or visibility. The increased situational awareness lowers the probability of the aircraft flying into terrain. On the other hand, current technology only allows real-time weather information to be rendered on a weather radar display with a two-dimensional track-up display or a north-up plan map display. With the advantages of showing 3-D terrain on a cockpit display, a 3-D display of weather would have similar advantages, especially in the terminal area.

Three-dimensional weather information, collected from ground sources, may be sent to the aircraft via a datalink. However, during terminal area maneuvers, real-time weather is more beneficial to the pilot. More specifically, the pilot needs to know accurate estimates of storm cells, windshear, and turbulent regions while in the terminal area. Due to the current latency or time delays associated with obtaining ground-based weather information, real-time 3-D weather information cannot be acquired via a datalink. Such real-time 3-D weather information can only be provided by a real-time weather information system such as what is typically provided on board an aircraft. Currently, pilots rely on the onboard weather radar for rapid weather updates of convection and turbulent regions, not only in terminal areas, but also while en route to a destination airport.

Pilots can currently use a head down track-up display of on-board weather radar information. However, this presents additional pilot workload, because pilots may be using a head-down or head-up three-dimensional computer-generated terrain display while maneuvering in the terminal area and monitoring multiple displays while making critical take-off or landing maneuvers. Pilots would have to look at another display, separate from the terrain display, to view two-dimensional weather information, and then mentally project that weather information onto the three-dimensional display that is being used for the landing maneuvers.

It is therefore an object of the invention to provide a system that displays real-time weather information to a pilot of an aircraft.

It is a further object of the invention to display real-time, three-dimensional weather information in combination with a display of three-dimensional terrain information and other potential hazards.

It is a further object of the invention to provide a system that displays real-time weather information to a pilot of an aircraft, where the system can rely on information obtained solely from onboard radar equipment.

A feature of the invention is the use of multiple, non-coplanar radar scans from onboard radar equipment, where the scans are used to create a revisable three-dimensional model of storm cells.

An advantage of the invention is that the three-dimensional weather information is provided in real time and can be incorporated into computer-generated terrain displays.

SUMMARY OF THE INVENTION

The invention provides a method of displaying real-time, three-dimensional weather information. According to the method, a first representation of a weather event along a first plane is generated from data obtained from a first radar scan. A second representation of the weather event along a second plane is generated from data obtained from a second radar scan. The first and second planes are non-coplanar. The first and second representations are combined to form a three-dimensional model of the weather event. A three-dimensional shape of the three-dimensional model is constructed. The three-dimensional shape is displayed on an avionics display.

The invention also provides a method of rendering, in an aircraft, a three-dimensional model of a weather event. According to the method, a first airborne radar scan is performed across a first plane. The first plane is generally horizontal. Intensity data, based upon reflectivity detected during the first radar scan, is extracted. A first shape descriptor is generated that represents the weather event along the first plane. The location of the weather event is determined. A second airborne radar scan is performed across a second plane. The first and second planes are substantially non-coplanar. Intensity data, based upon reflectivity detected during the second radar scan, is extracted. A second shape descriptor is generated that represents the weather event along the second plane. The first shape descriptor and the second shape descriptor are combined to form a three-dimensional model of the weather event. A three-dimensional shape is constructed from the three-dimensional model. The three-dimensional shape is configured for display on an airborne display.

The invention further provides an airborne weather radar system for obtaining and displaying real-time weather information in a three-dimensional format in an aircraft. An airborne horizontal scanning radar apparatus periodically scans along a generally horizontal plane. A processor determines a weather event based upon reflectivity readings from the horizontal scanning radar apparatus. The processor generates a first shape descriptor representative of the weather event as detected along the generally horizontal plane. An airborne vertical scanning radar apparatus scans along a vertical plane. The vertical plane has a bearing corresponding to a predetermined part of the first shape descriptor. The processor generates a second shape descriptor representative of the weather event as detected along the vertical plane. The processor generates a three-dimensional model of the weather event using the first and second shape descriptor. A display is used to render a three-dimensional shape that is based upon the three-dimensional model.

DETAILED DESCRIPTION OF THE DRAWINGS

Figure 1:
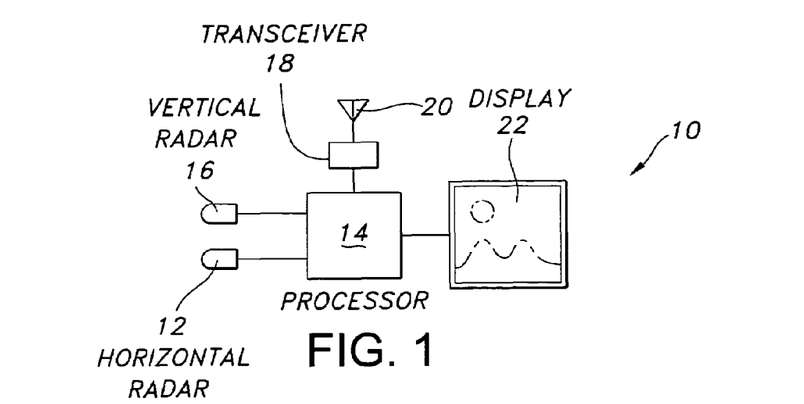
FIG. 1 is a schematic diagram of an airborne weather display system according to the invention.
Figure 2:
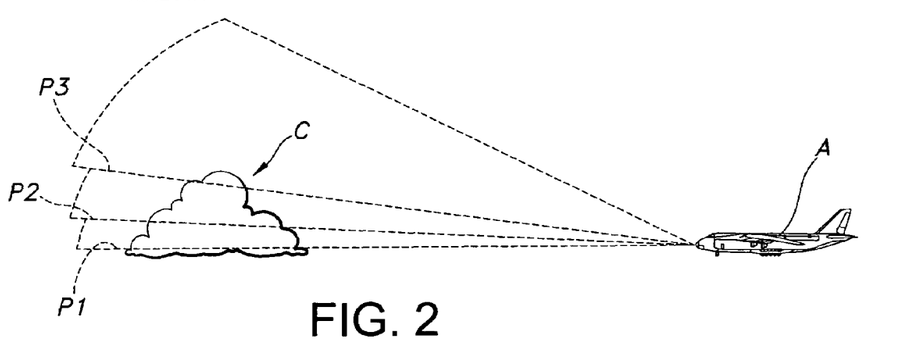
FIG. 2 is a perspective view of an aircraft horizontally scanning a weather event according to an embodiment of the invention.

The invention provides real-time three-dimensional weather information to a pilot of an aircraft. To accomplish this, each embodiment described herein preferably uses an onboard system 10, shown in FIG. 1, that employs onboard radar, processing equipment, and a display. More particularly, system 10 includes a horizontal scanning radar apparatus 12 configured to periodically scan in a generally horizontal plane relative to the aircraft in which system 10 resides. Horizontal radar 12 may be designed to scan every six to eight seconds, for example. As shown in FIG. 2, horizontal radar 12 is further designed to slightly tilt up and down so that multiple scans of a weather event by the horizontal radar provide readings at different elevations of the weather event. Horizontal radar 12 inputs weather scan data to a processor 14.

A vertical scanning radar apparatus 16 is configured to selectively scan in a plane substantially orthogonal to the generally horizontal plane. Vertical scanning radar apparatus may be integral with horizontal scanning radar apparatus 12 but is disclosed herein as being separate therefrom. Vertical radar 16 inputs weather scan data to processor 14. The processor may also receive inputs from a transceiver 18, which through an antenna 20 obtains ground-based weather information. Processor 14 provides inputs to a display 22, which in a preferred embodiment also displays a three-dimensional terrain rendering.

Figure 3:
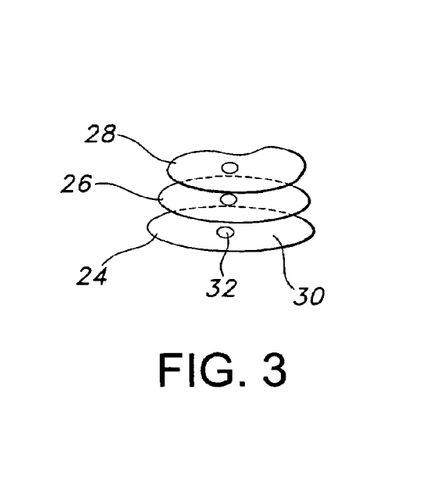
FIG. 3 is a perspective view of a plurality of parallel scans of a weather event.
Figure 4:
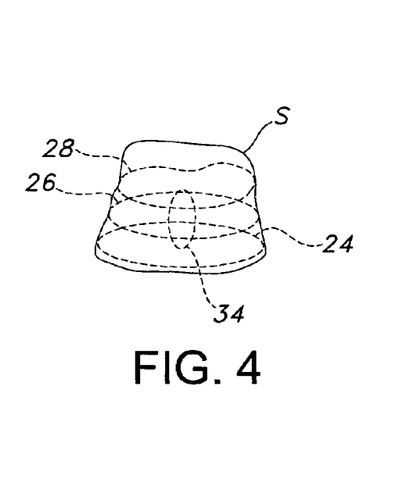
FIG. 4 is a perspective view of a three-dimensional rendering of the weather event shown in FIG. 3.

Using system 10 as described above, an embodiment of the invention will now be described with respect to FIGS. 2-4. As shown in FIG. 2, horizontal scanning radar apparatus 12, which is mounted on aircraft A, performs a substantially horizontal radar scan across a generally horizontal plane P1 toward a weather event, which may be a turbulent region or a storm cell C. Horizontal scanning radar apparatus 12 sends the returned radar information to processor 14. The returned radar information comprises a level of reflectivity, corresponding to storm intensity, for each coordinate, or pixel, of the horizontal radar scan. Processor 14 uses the storm intensity information to determine the presence and the boundaries, along plane P1, of the storm cell. Processor 14 also detects the boundaries, within the storm cell, of regions of varying intensity. Using the pixel intensity information, processor generates a shape descriptor that is a representation of the various reflectivity or intensity regions of the storm cell. For example, as shown graphically in FIG. 3, a shape descriptor 24 has been generated from storm intensity information obtained while scanning across plane P1 and represents a region of high reflectivity characteristic of a storm cell along plane P1. Shape descriptor 24 includes a region 30 of relatively low intensity as well as a region 32 of relatively high intensity. Using known information about the aircraft and the radar, it is determined where shape descriptor 24 exists in the atmosphere. Information such as aircraft location, aircraft altitude, the beamwidth of horizontal radar 14, the tilt angle of the horizontal radar when scanning across plane P1, and the range of the horizontal radar, are helpful in determining where the portion of storm cell C, represented by shape descriptor 24, is actually located.

Using the above process, additional shape descriptors 26, 28 of storm cell C are obtained by horizontally scanning across planes P2 and P3. This is accomplished by varying the tilt angle at which horizontal radar 12 scans. The resulting shape descriptors 26, 28 are generally parallel to each other and represent horizontal cross-sections of storm cell C at different altitudes. Processor 14 tracks the position and movement of each shape descriptor, as well as the position and movement of aircraft A, to ensure that a shape descriptor obtained during each horizontal scan is associated with and is properly aligned with shape descriptors obtained during previous horizontal scans. When at least two shape descriptors are obtained for the storm cell, processor 14 constructs a three-dimensional model of the storm cell from the properly aligned shape descriptors. As shown in FIG. 4, a linear or curve-fitting algorithm is employed to connect the edges of the various reflectivity regions of shape descriptors 24, 26, 28. The linear or curve-fitting algorithm is applied over the entire three-dimensional space that represents the storm cell or turbulent region so that a three dimensional shape S is formed that graphically represents storm cell C. The linear or curve-fitting algorithm is also applied to each intensity region within storm cell C so that each defined intensity region is rendered in three dimensions. As shown in FIG. 4, three-dimensional shape S includes a high-intensity volume 34, positioned concentrically within three-dimensional shape S, that signifies a volume of high reflectivity (and corresponding storm intensity) relative to the surrounding portions of three-dimensional shape S. High-intensity volume 34 is visible if the surrounding portions of three-dimensional shape S are displayed as transparent or lightly shaded. Volumes representing increasing thresholds of intensity may be shaded different colors, such as green, amber, orange, and red. Once three-dimensional shape S has been constructed, software and/or hardware associated with processor 14 renders the three-dimensional shape on a 3-D display.

The process of applying a curve-fitting algorithm to a plurality of shape descriptors is repeated each time another shape descriptor is added to the three-dimensional model of the storm cell. In other words, each time horizontal radar 12 scans across another horizontal plane, three-dimensional shape S becomes more accurately defined. Although some storm cells may require up to ten horizontal scans to achieve highly accurate definition, three-dimensional shape S provides useful, real-time weather information to the pilot of aircraft A with only a few horizontal scans.

Figure 5:
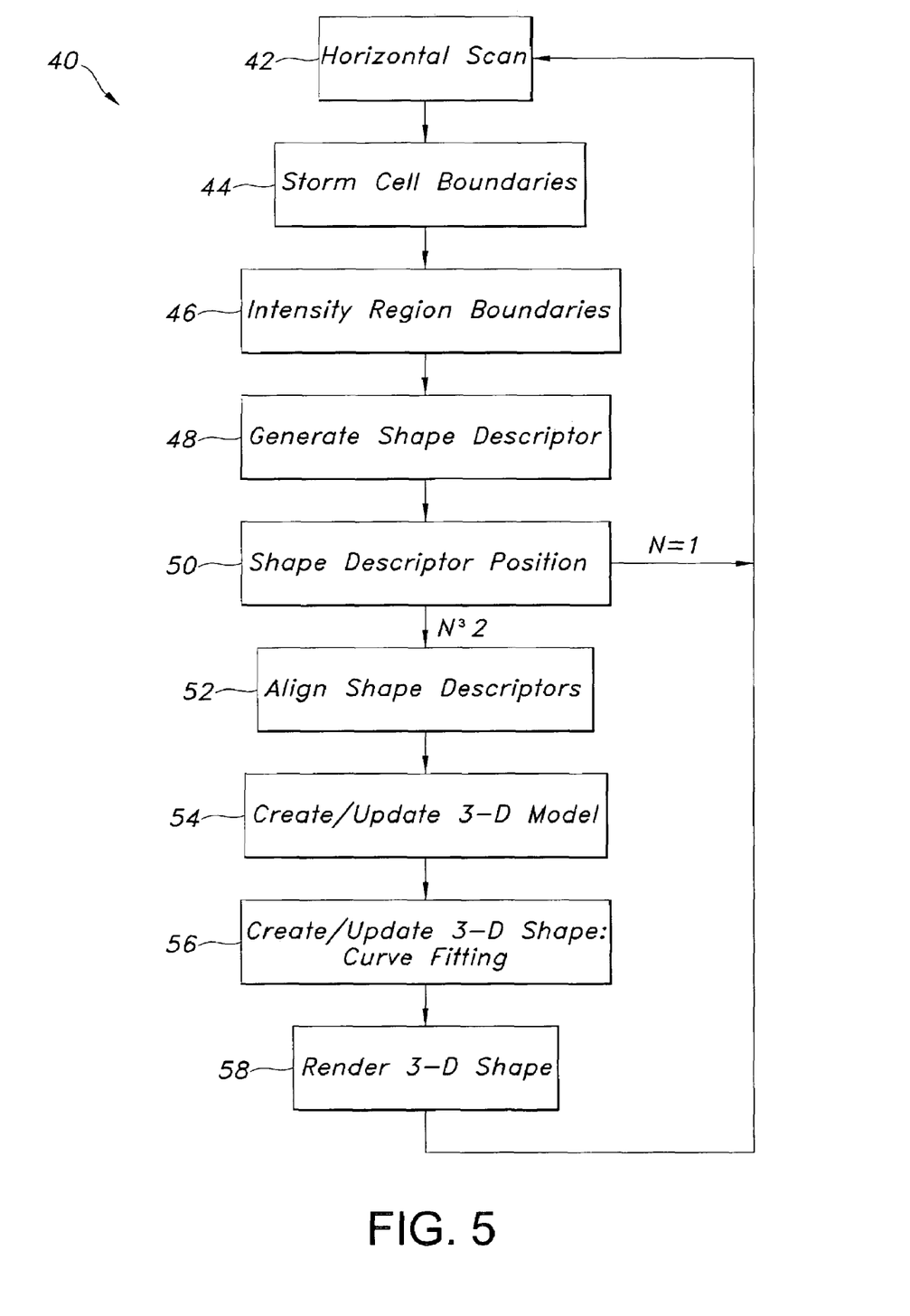
FIG. 5 is a flowchart of a method of the embodiment shown in FIGS. 2-4.

FIG. 5 is a flowchart showing a method 40 of the invention according to the embodiment described above. In step 42, a horizontal radar scan is taken. In step 44, storm cells and their boundaries are determined by extracting storm intensity levels from the reflectivity readings of the radar. In step 46, regions within the storm cell exceeding predefined intensity thresholds are identified. In step 48, a shape descriptor is generated based on the storm intensity levels. In step 50, the position of the shape descriptor is determined using inputs such as aircraft location, aircraft altitude, radar beamwidth, and radar tilt and range. If only one shape descriptor has been generated, steps 42 through 50 are repeated with a different radar tilt angle to generate a second shape descriptor substantially parallel to the first shape descriptor.

When two or more shape descriptors have been generated, then in step 52, the shape descriptors are aligned with each other. In step 54 a three-dimensional model of the storm cell is created that incorporates the shape descriptors. In step 56 a three-dimensional shape is created from the three-dimensional model by applying a linear or curve-fitting algorithm to connect the edges of the shape descriptors. In step 58 the three-dimensional shape is rendered on a display, which is preferably a three-dimensional display that also displays computer-generated three-dimensional terrain information thereon. The method returns to step 42 to perform further horizontal scans at different tilt angles, and with the newly obtained information adds further shape descriptors to continually update the three-dimensional model and the three-dimensional shape rendered on the display.

The above embodiment may be varied by obtaining multiple, substantially parallel radar scans of a weather event using vertical scanning radar apparatus 16. The creation and rendering a three-dimensional model of the weather event is accomplished in a manner otherwise similar to the method described in FIG. 5.

Figure 6:
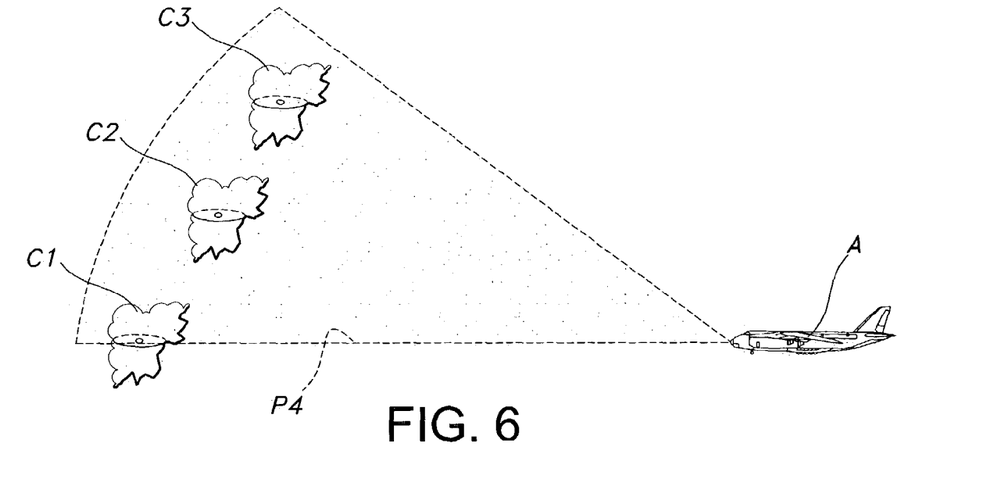
FIG. 6 is a perspective view of an aircraft horizontally scanning a plurality of weather events according to another embodiment of the invention.
Figure 7:
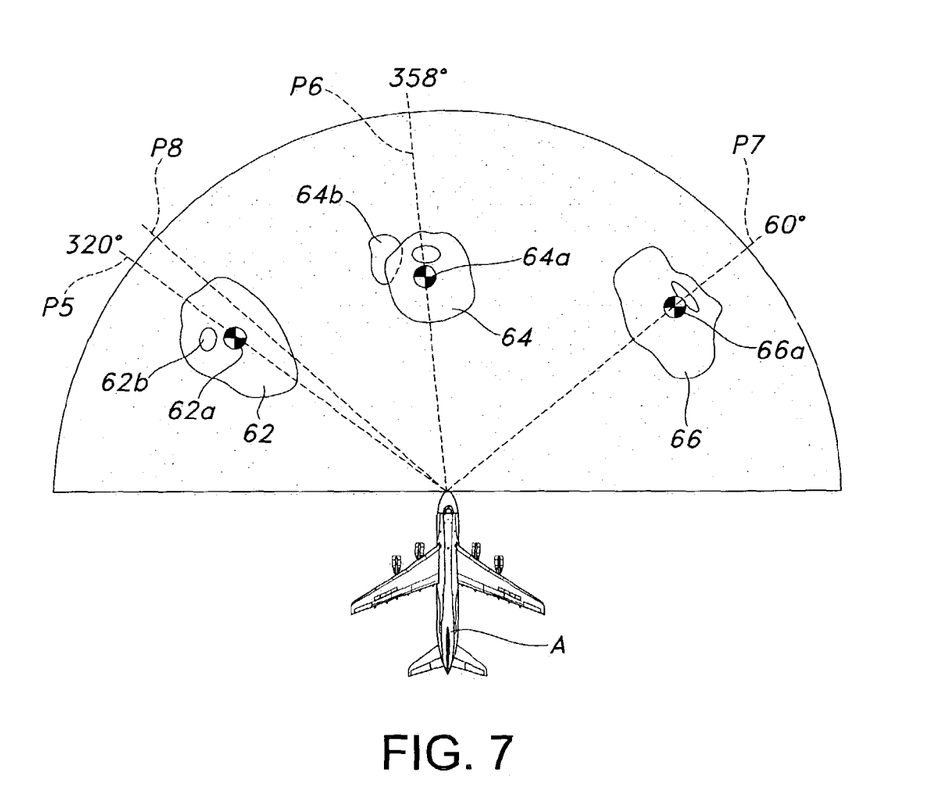
FIG. 7 is a top view of a graphical rendering of the horizontal scan of FIG. 6.

There may be drawbacks to fusing together multiple parallel radar scans, regardless of whether the scans are substantially horizontal or substantially vertical. For example, when fusing together multiple horizontal scans, as shown in FIGS. 2-4, the vertical boundaries of a storm cell may not be captured in any of the horizontal scans. Therefore, the resultant three-dimensional shape may not accurately depict the storm cell top or the upper or lower boundary of the turbulent region associated with the storm cell. To solve this problem, the embodiment of the invention depicted in FIGS. 6-12 may be used. As shown in FIG. 6, aircraft A employs horizontal scanning radar apparatus 12 to provide a radar scan across a substantially horizontal plane P4, which intersects storm cells C1, C2 and C3. As with the previous embodiment, horizontal scanning radar apparatus 12 sends the returned radar information to processor 14. The returned radar information includes storm intensity information, as previously defined. The processor uses the storm intensity information to determine the presence and the boundaries, along plane P4, of each storm cell C1, C2, and C3. The processor also detects the boundaries, within each storm cell, of regions of varying intensity. Using the storm intensity information, the processor generates shape descriptors 62, 64 and 66 that are characterized by the derived intensity boundaries of the respective storm cell along plane P4. Processor 14 determines the location, relative to aircraft A, of each shape descriptor 62, 64 and 66. FIG. 7 graphically depicts the position of each shape descriptor relative to aircraft A, as seen from above. It can be seen that a region of turbulence 64b is associated with shape descriptor 64 and may be modeled concurrently with shape descriptor 64. The region of turbulence may be rendered in a different color from the shape descriptor to ensure differentiation therefrom.

Next, vertical scanning radar apparatus 16 scans each storm cell in a vertical plane P5, P6, and P7, respectively. The precise bearing at which vertical radar 16 conducts its scan is determined by locating the center 62a, 64a, 66a of each shape descriptor. This may be done using known mathematical algorithms for finding the center or centroid of an irregular object. If desired, the position of the center may be weighted by the location of a region of high intensity 62a within the shape descriptor. In FIG. 7, the centers of the storm cells 62, 64, and 66 are located at bearings of about 320 degrees, 358 degrees, and 60 degrees, respectively. Taking storm cell C1 as exemplary, vertical scanning radar apparatus 16 scans along vertical plane P5 and sends the reflected radar information to processor 14. The reflected radar information includes storm intensity information, as previously defined. The processor uses the storm intensity information to determine the presence and the boundaries, along vertical plane P5, of storm cell C1. The processor also detects the boundaries, within the storm cell, of regions of varying intensity. Using the storm intensity information, the processor generates a vertical shape descriptor 68 characterized by the derived intensity boundaries of the respective storm cell along vertical plane P5. Processor 14 determines the location, relative to aircraft A, of vertical shape descriptor 68. Processor 14 tracks the position and movement of each shape descriptor, as well as the position and movement of aircraft A, to ensure that the shape descriptors obtained during the horizontal scan and the vertical scan are associated with and are properly aligned with each other.

Figure 8:
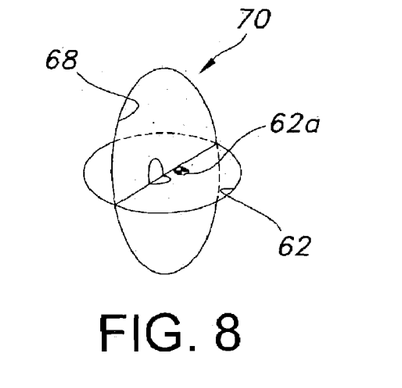
FIG. 8 is a perspective view of horizontal scan of one of the weather events depicted in FIGS. 6 and 7, combined with a vertical scan of the weather event.
Figure 9:
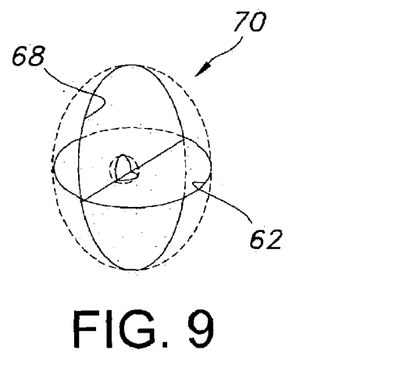
FIG. 9 is another perspective view of the combined horizontal and vertical scans shown in FIG. 8.
Figure 10:
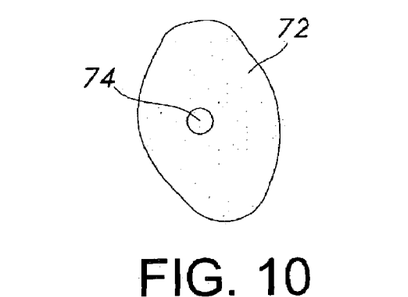
FIG. 10 is a perspective view of a three-dimensional rendering of the weather event shown in FIGS. 8-9.

As schematically shown in FIG. 8, shape descriptor 62 and vertical shape descriptor 68 are combined by the processor to form a three-dimensional model 70 of storm cell C1. The shape descriptors intersect along a line upon which centroid 62a lies. As shown in FIG. 9, a linear or curve-fitting algorithm is employed to connect the edges and the various reflectivity regions of shape descriptors 62 and 68. The linear or curve-fitting algorithm is applied over the entire three-dimensional space that represents the storm cell or turbulent region so that a three dimensional shape 72 is formed that graphically represents storm cell C1 (FIG. 10). The linear or curve-fitting algorithm is also applied to each intensity region within storm cell C1 so that each defined intensity region is rendered in three dimensions. As shown in FIG. 4, three-dimensional shape 72 includes a high-intensity volume 74, positioned concentrically within three-dimensional shape 72, that signifies a volume of high reflectivity (and corresponding storm intensity) relative to the surrounding portions of three-dimensional shape 72. As with the previously described embodiment, high-intensity volume 74 is visible if the surrounding portions of the three-dimensional shape are displayed as transparent or lightly shaded. Three-dimensional shape 72, once constructed, is then rendered on a 3-D display using known software or hardware associated with processor 14.

Figure 11:
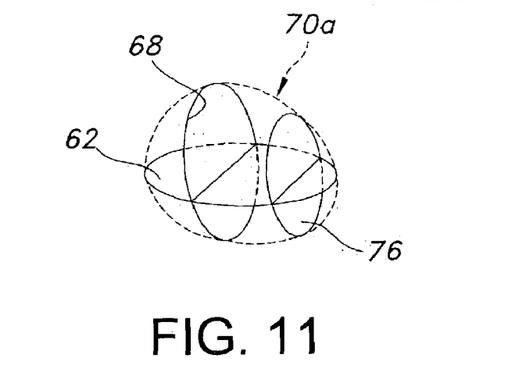
FIG. 11 is a perspective view of a horizontal scan of a weather event combined with two vertical scans of the weather event.
Figure 12:
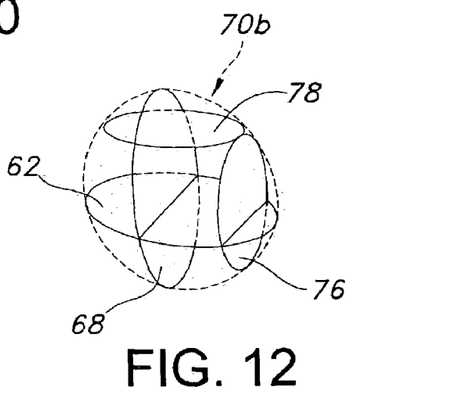
FIG. 12 is a perspective view of the weather event shown in FIG. 11 with an additional horizontal scan incorporated therein.
Figure 13:
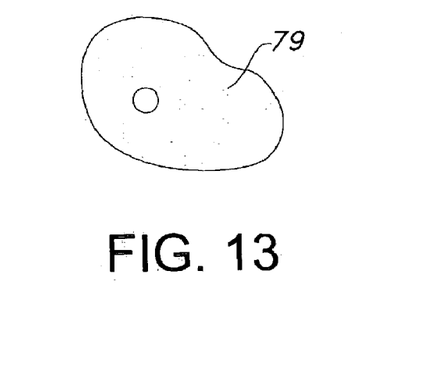
FIG. 13 is a perspective view of a three-dimensional rendering of the weather event shown in FIGS. 11 and 12.

Using the embodiment of the invention depicted in FIGS. 6-10, the horizontal and vertical extent of a storm cell may be quickly approximated with only two radar scans. To achieve a more precise model of the storm cell, further radar scans are conducted by horizontal scanning radar apparatus 12 and vertical scanning radar apparatus 16 as desired. For example, FIG. 11 shows an additional vertical shape descriptor 76 obtained from a vertical radar scan along horizontal plane P8 (FIG. 7). Processor 14 positions and aligns additional vertical shape descriptor 76 with respect to previously-obtained shape descriptors and revises three-dimensional model 70 to incorporate the additional vertical shape descriptor. The revised three-dimensional model, shown in FIG. 11 at reference number 70a, represents an increasingly accurate model of storm cell C1. FIG. 12 shows a further revised three-dimensional model 70b which incorporates an additional horizontal shape descriptor 78 obtained from a horizontal radar scan along a plane substantially parallel to plane P4 (FIG. 6). Adding horizontal shape descriptor 78 to previously obtained shape descriptors 62, 68 and 78 increases the accuracy of three-dimensional model 70b over previously created models. Further horizontal and/or vertical scans may be conducted, according to the principles described herein, to further refine and increase the accuracy of the model of the storm cell, as shown at 79 in FIG. 13.

Because of the wide variety in the shape and bearing of storm cells and other weather events, the invention uses a scanning strategy to determine the scans necessary to best model nearby weather events. The scanning strategy, which preferably incorporates a heuristic decision process, includes a predefined scanning hierarchy to ensure that scans of weather events most relevant to the flight plan or welfare of the aircraft take precedence over less relevant weather events. For example, in the horizontal radar scan depicted in FIG. 7, scanning and modeling of storm cell 64, which is directly ahead of aircraft A, would take precedence over scanning and modeling of storm cells 62 and 66, which are 40 and 60 degrees off of the aircraft's current heading. As between storm cells 62 and 66, a storm cell having unusually high intensity readings would likely be highly relevant to an aircraft's safety, and the heuristics used by the invention would increase the priority of modeling and rendering such a storm cell.

Figure 14:
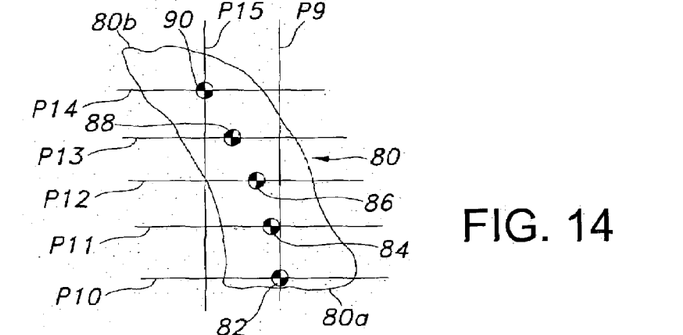
FIG. 14 is a side elevational view of a weather event showing locations of vertical and horizontal radar scans according to the invention.

A heuristic decision process is also useful in determining how to scan an individual weather event. For example, as shown in FIG. 14, a storm cell 80 has a bottom 80a and a top 80b that are not vertically aligned with each other. Such a storm cell may be termed as 'leaning' to one side. A vertical scan P9 at the centroid 82 of a horizontal scan P10 taken near the bottom of the storm cell will not provide an accurate model of the storm cell. The heuristic decision process may therefore be programmed to identify a storm cell as 'leaning', and render the storm cell as leaning, when the respective centroids 84, 86, 88, 90 of one or more successive horizontal scans P10, P11, P12, P13, and P14 are not vertically aligned with each other. The decision process may then instruct the system to take one or more vertical scans at bearings best determined to accurately bound and define the dimensions of the storm cell, which in FIG. 14 may be vertical scan P15.

Figure 15:
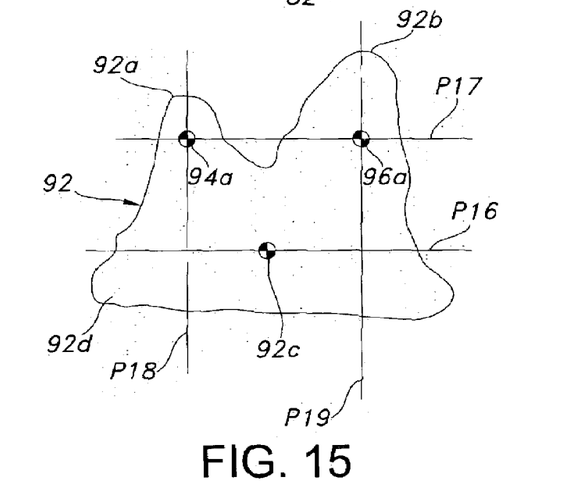
FIG. 15 is a side elevational view of another weather event showing locations of vertical and horizontal radar scans according to the invention.
Figure 16:
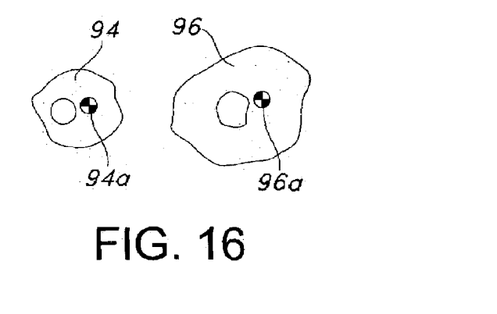
FIG. 16 is a section view taken along horizontal scan P17 in FIG. 15.

In another example, as shown in FIG. 15, a storm cell 92 may have two 'heads' or tops 92a, 92b, and a vertical scan at the centroid 92c of a horizontal scan P16 near the bottom 92d of the storm cell may not accurately capture the vertical extent of the storm cell. The heuristic decision process may therefore be programmed to identify multi-headed storms when a successive horizontal scan P17 detects substantially non-coterminous portions 94, 96 of the storm cell, as shown in FIG. 16. The system may therefore be directed to obtain vertical scans P18, P19 at the bearings of the respective centroids 94a, 96a of each of the substantially non-coterminous portions, thereby enabling the system to obtain and render a more accurate model of the storm cell. The examples in FIGS. 7 and 14-16 are demonstrative of situations in which heuristics may be used to improve modeling accuracy. Other heuristics or decision logic, designed to accommodate other situations and storm types and shapes, may also be included within the system and are considered to be within the scope of the invention.

Figure 17:
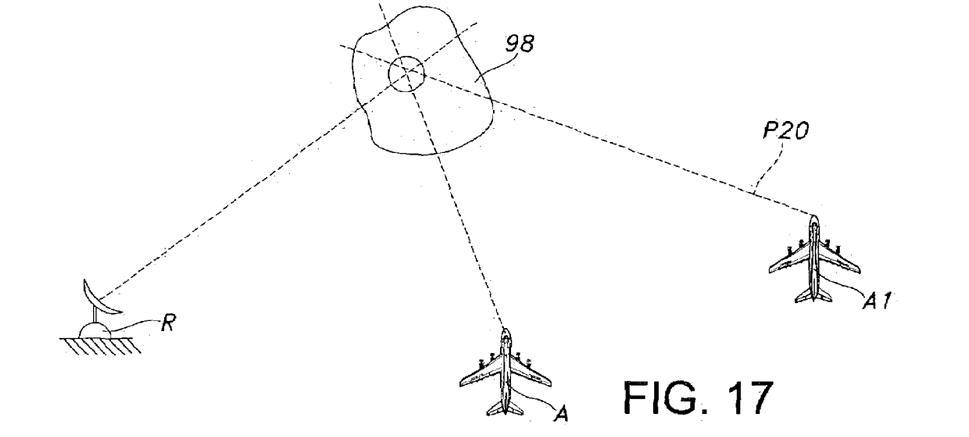
FIG. 17 is a top plan view of a weather event being scanned from multiple positions according to another embodiment of the invention.

The constructing and revising of three-dimensional models of weather events may include information other than what is derived from the shape descriptors. For example, it may be known that a weather event is growing or shrinking at a certain rate and/or direction, or that the weather event is moving in a certain direction or velocity. Other useful information may include the speed, heading, and area of the weather event, precipitation rates and precipitation types associated with the weather event, and information about the top of the weather event. As shown in FIG. 17, information from ground-based radar R, received through transceiver 18 mounted in aircraft A, may also be helpful in modeling a weather event 98. A radar scan P20 of the weather event, taken by nearby aircraft A1, may also be received by transceiver 18. The modeling-algorithms used by processor 14 may incorporate such information into the model of the weather event to increase the accuracy of the model. Including off-aircraft information in the model of the weather event provides redundancy in case one or more weather sources is offline. In addition, multiple perspectives of the same cell help prevent modeling errors caused by lack of data or radar attenuation.

Figure 18:
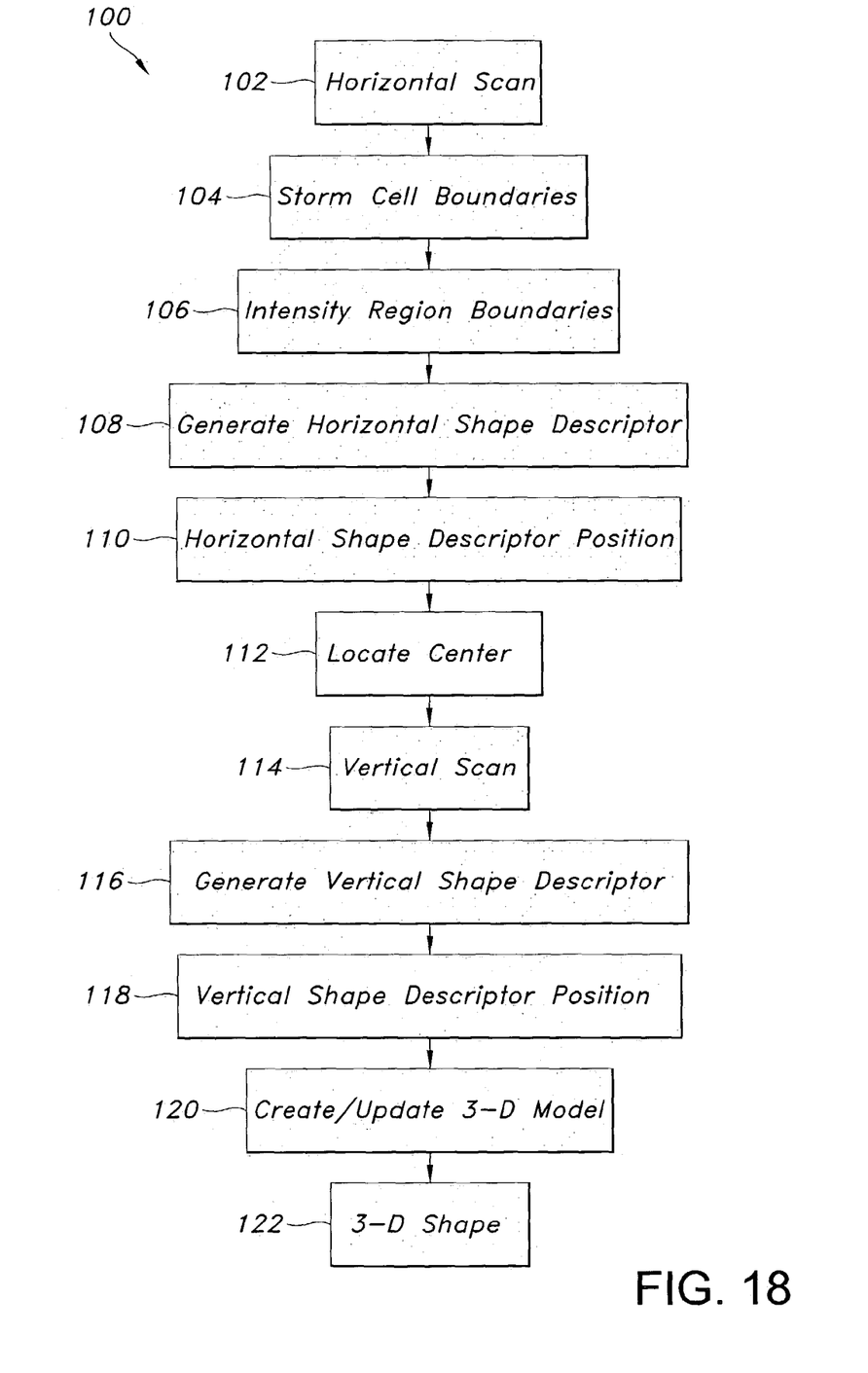
FIG. 18 is a flowchart of a method of the embodiment shown in FIGS. 6-12.

FIG. 18 is a flowchart showing a method 100 of the invention according to the embodiment described above. In step 102, a horizontal radar scan is taken. In step 104, a storm cell and its boundaries are determined by extracting storm intensity levels from the reflectivity readings of the horizontal radar scan. In step 106, regions within the storm cell exceeding predefined intensity thresholds are identified. In step 108, a shape descriptor for the storm cell is generated based on the storm intensity levels. In step 110, the position of the shape descriptor is determined using inputs such as aircraft altitude, radar beamwidth, and radar tilt and range. In step 112 a center of the shape descriptor is calculated. In step 114 a vertical radar scan is taken at the bearing of the storm cell center, or at another bearing determined by heuristic decision logic. In step 116 a shape descriptor is generated using storm intensity level information extracted from the reflectivity readings of the radar scan. Regions within the storm cell, along the vertical scan, are identified if predetermined intensity levels are exceeded. In step 118 the position of the vertical shape descriptor is located, and it is verified that the horizontal shape descriptor and the vertical shape descriptor represent the same storm cell. In step 120 the vertical and horizontal shape descriptors are combined to form a three-dimensional model of the storm cell. Heuristic decision logic may be used in forming and rendering the model. Other information, such as ground-based radar data or knowledge regarding the increasing or decreasing size of the storm cell, may also be factored into the 3-D model of the storm cell. In step 122 a three-dimensional shape is created from the three-dimensional model by applying a linear or curve-fitting algorithm to connect the edges of the shape descriptors. The three-dimensional shape may then be displayed on a three-dimensional display. The three-dimensional model is then refined or revised by conducting additional horizontal and/or vertical scans of the storm system as determined by heuristic decision logic and incorporating the resulting shape descriptors into the model.

Although the invention has been described as being useful for detecting and modeling storm cells, other weather events such as regions of turbulence may also be detected and modeled by the invention. Such detection and modeling of other types of weather events are considered to be within the scope of the invention.

The invention may also be used in a ground-based radar environment to detect and render three-dimensional models of weather events.

The invention has been described as combining radar scans of weather events along generally horizontal and vertical planes. It is to be understood that, as shown in FIG. 2, generally horizontal planes are not exactly parallel to each other because each horizontal plane originates from and therefore intersects at aircraft A. For the purposes of the invention, however, the distances at which weather events are typically detected allows the invention to consider the horizontal planes as parallel.

Figure 19:
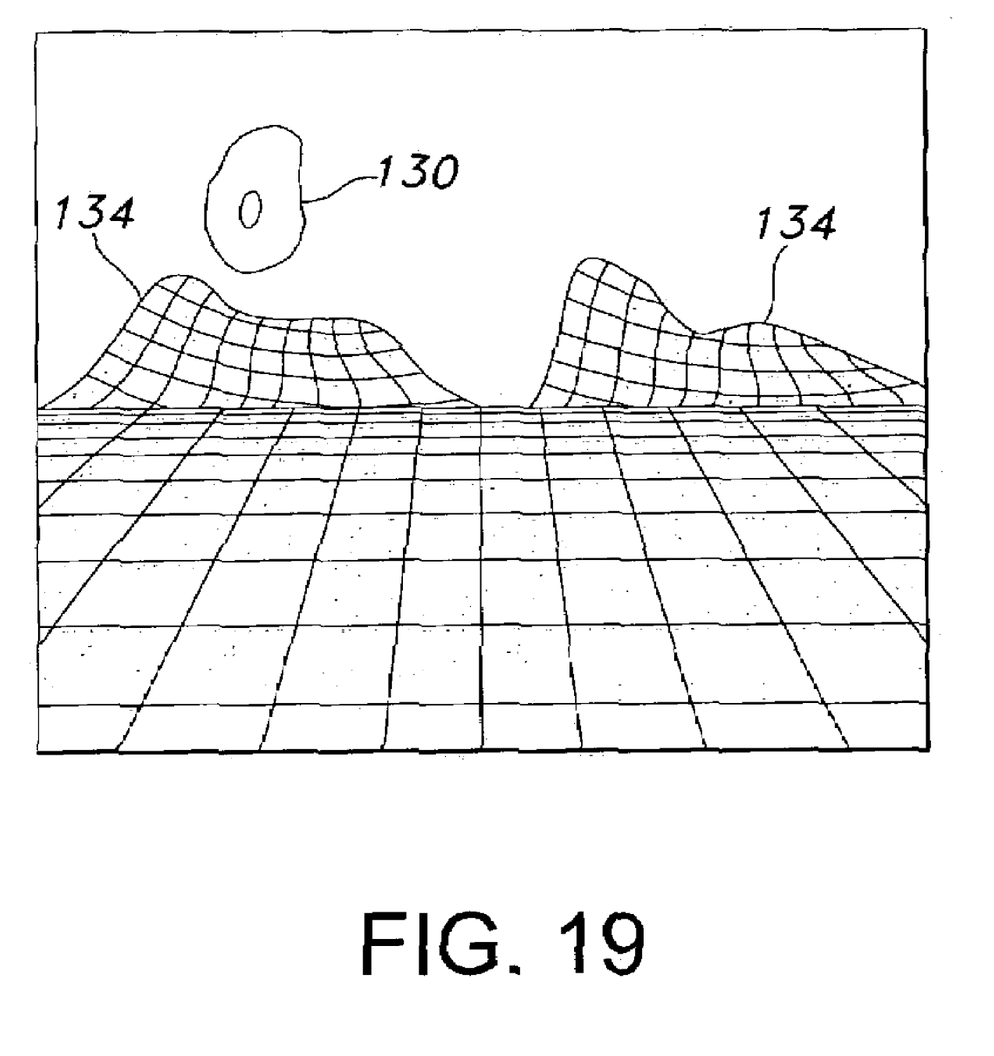
FIG. 19 is a schematic view of a display that implements the invention.

Accordingly, the invention provides real-time, three-dimensional models of storm cells that provide an increasingly accurate portrayal of the storm cells. As shown in FIG. 19, a three-dimensional storm cell model 130, constructed according to the invention, may be advantageously incorporated into a display 132 that provides a computer-generated, three-dimensional rendering of nearby terrain 134, nearby aircraft traffic, and other potential hazards.

An advantage of the invention is that a pilot of an aircraft obtains three-dimensional terrain and weather information by viewing a single display, and pilot workload is thereby decreased.

Another advantage of the invention is that three-dimensional weather information is obtained and displayed in real time. This is especially advantageous during take-off, landing, and taxiing operations.

Still another advantage of the invention is that the number of radar scans needed to form a three-dimensional model of a storm cell is minimized by judiciously obtaining and combining horizontal and vertical airborne radar scans.

Yet another advantage is that the invention uses equipment commonly found on commercial aircraft. As a general rule, no new equipment is needed to practice the invention.

Still another advantage of the invention is that weather-related information from other sources, such as ground-based weather radar information, may be used to supplement the airborne radar scans.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of displaying real-time, three-dimensional weather information, comprising:
   generating, from data obtained from a first radar scan, a first representation of a weather event along a first plane;
   generating, from data obtained from a second radar scan, a second representation of the weather event along a second plane, where the second plane is non-coplanar with the first plane;
   combining the first and second representations to form a three-dimensional model of the weather event;
   constructing a three-dimensional shape of the three-dimensional model; and
   displaying the three-dimensional shape on a display.

2. The method of claim 1, wherein the second plane is substantially orthogonal to the first plane.

3. The method of claim 2, wherein the first radar scan is a first airborne radar scan, and wherein the second radar scan is a second airborne vertical radar scan performed at a bearing relative to the aircraft, said bearing corresponding to a predetermined part of the first representation.

4. The method of claim 3, wherein the predetermined part is a center of the first representation.

5. The method of claim 3, further comprising:
   generating, from data obtained from a third airborne radar scan, a third representation of the weather event along a third plane, where the third plane is non-coplanar with the first and second planes;
   combining the third representation with the first and second representations to update the three-dimensional model; and
   updating the three-dimensional shape based on the updated three-dimensional model.

6. The method of claim 5, wherein at least one of the second and third airborne radar scans are conducted in a substantially vertical plane that is substantially orthogonal to the first plane.

7. A method of rendering, in an aircraft, a three-dimensional model of a weather event, comprising:
   performing a first airborne radar scan across a first plane, where the first plane is generally horizontal;
   extracting intensity data based upon reflectivity detected during the first radar scan;
   generating a first shape descriptor that represents the weather event along the first plane;
   determining a location of the weather event;
   performing a second airborne radar scan across a second plane, where the first and second planes are substantially non-coplanar;
   extracting intensity data based upon reflectivity detected during the second radar scan;
   generating a second shape descriptor that represents the weather event along the second plane;
   combining the first shape descriptor and the second shape descriptor to form a three-dimensional model of the weather event; and
   constructing a three-dimensional shape from the three-dimensional model, wherein the three-dimensional shape is configured for display on an airborne display.

8. The method of claim 7, wherein the second plane is generally horizontal and is generally parallel to the first plane.

9. The method of claim 7, wherein the second plane is substantially orthogonal to the first plane.

10. The method of claim 9, wherein the second airborne radar scan is performed in a predetermined direction relating to the location of the weather event.

11. The method of claim 10, wherein the predetermined direction is obtained by
calculating a center of the weather event along the first plane, and
determining a bearing of the center relative to the aircraft, wherein the bearing is the predetermined direction.

12. The method of claim 10, wherein the predetermined direction is obtained by
determining a location in the weather event along the first plane corresponding to a level of intensity higher than other portions of the weather event, and
determining the bearing of the location relative to the aircraft, wherein the bearing is the predetermined direction.

13. The method of claim 7, further comprising:
performing a third airborne radar scan across a third plane, where the first, second and third planes are non-coplanar;
extracting intensity data based upon reflectivity detected during the third radar scan;
generating a third shape descriptor that represents the weather event along the third plane;
combining the third shape descriptor to the first and second shape descriptors to update the three-dimensional model of the weather event; and
updating the three-dimensional shape using the updated three-dimensional model.

14. The method of claim 13, wherein at least one of the second and third planes are substantially orthogonal to the first plane.

15. The method of claim 13, wherein at least one of the second and third planes are generally parallel to the first plane.

16. The method of claim 7, further comprising rendering the three-dimensional shape on an airborne display, where the airborne display concurrently renders three-dimensional terrain information.

17. The method of claim 7, wherein the three-dimensional model is formed in part by factoring in a change in volume of the weather event.

18. The method of claim 7, wherein the three-dimensional model is supplemented by information from one of ground-based weather radar and weather information detected by another aircraft.

19. An airborne weather radar system for obtaining and displaying real-time weather information in a three-dimensional format in an aircraft, comprising:
an airborne horizontal scanning radar apparatus that periodically scans along a generally horizontal plane;
a processor that determines a weather event based upon reflectivity readings from the horizontal scanning radar apparatus, the processor further generating a first shape descriptor representative of the weather event as detected along the generally horizontal plane;
an airborne vertical scanning radar apparatus that scans along a vertical plane, the vertical plane having a bearing corresponding to a predetermined part of the first shape descriptor, wherein the processor generates a second shape descriptor representative of the weather event as detected along the vertical plane, and further wherein the processor generates a three-dimensional model of the weather event using the first and second shape descriptors; and
a display, upon which is rendered a three-dimensional shape that is based upon the three-dimensional model.

20. The airborne weather radar system of claim 19, further comprising a transceiver configured to receive ground-based weather radar information, wherein the processor incorporates the ground-based weather radar information into the generation of the three-dimensional model of the weather event.

* * * * *